United States Patent [19]
Blandin et al.

[11] 4,370,186
[45] Jan. 25, 1983

[54] METHOD FOR MANUFACTURING A METAL-PLASTICS COMPOSITE TUBE AND APPARATUS FOR CARRYING OUT SAID METHOD

[75] Inventors: Jean-Claude Blandin; Louis Richard, both of Cholet, France

[73] Assignee: Nadia Nicoll, Societe a responsabilite limitee, Cholet, France

[21] Appl. No.: 218,261

[22] Filed: Dec. 19, 1980

[51] Int. Cl.³ .................. B29D 23/04; B29D 23/10
[52] U.S. Cl. .................. 156/203; 156/218; 156/244.13; 156/244.14; 156/327; 156/466; 156/500; 425/133.1; 427/239
[58] Field of Search ............ 156/244.11, 244.13, 156/244.14, 203, 218, 466, 500, 327; 428/35, 36; 264/173, 209; 427/234, 239; 118/302, 317, 408, 411, DIG. 10; 425/112, 133.1, 91, 92, 97, 114; 138/125, 127, 128, 137, 141, 143, 146

[56] References Cited
U.S. PATENT DOCUMENTS

| | | | |
|---|---|---|---|
| 2,820,249 | 1/1958 | Colombo | 118/302 |
| 3,207,651 | 9/1965 | Hood et al. | 156/244.13 |
| 3,376,181 | 4/1968 | Larson et al. | 156/203 |
| 3,896,764 | 7/1975 | Kiodl et al. | 118/408 |
| 3,987,122 | 10/1976 | Baitz et al. | 156/327 |
| 4,161,379 | 7/1979 | Sudyk | 425/112 |
| 4,199,622 | 4/1980 | Kekumai et al. | 427/239 |

FOREIGN PATENT DOCUMENTS

883562  11/1961  United Kingdom .......... 264/173

*Primary Examiner*—Caleb Weston
*Attorney, Agent, or Firm*—Murray and Whisenhunt

[57] ABSTRACT

The present invention relates to a method and apparatus for obtaining a metal-plastics composite tube. A layer of grafted polyethylene which comes directly into contact with the metal and a layer of cross-linkable polyethylene are extruded simultaneously at least inside this tube, with the aid of an extrusion nozzle having an annular conduit with two distinct coaxial inlets and a single outlet. The invention results in a composite tube having the malleability of lead, the rigidity of copper and a total inertia with respect to the aggressive agents flowing therein.

8 Claims, 4 Drawing Figures

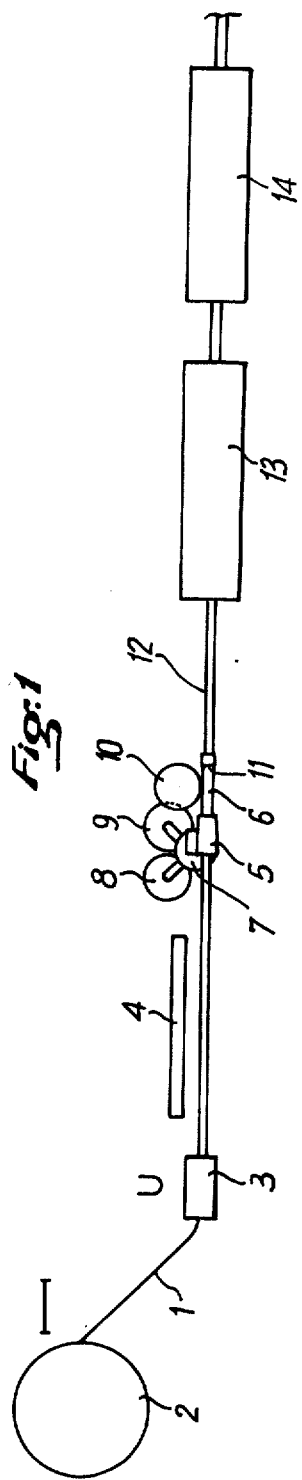
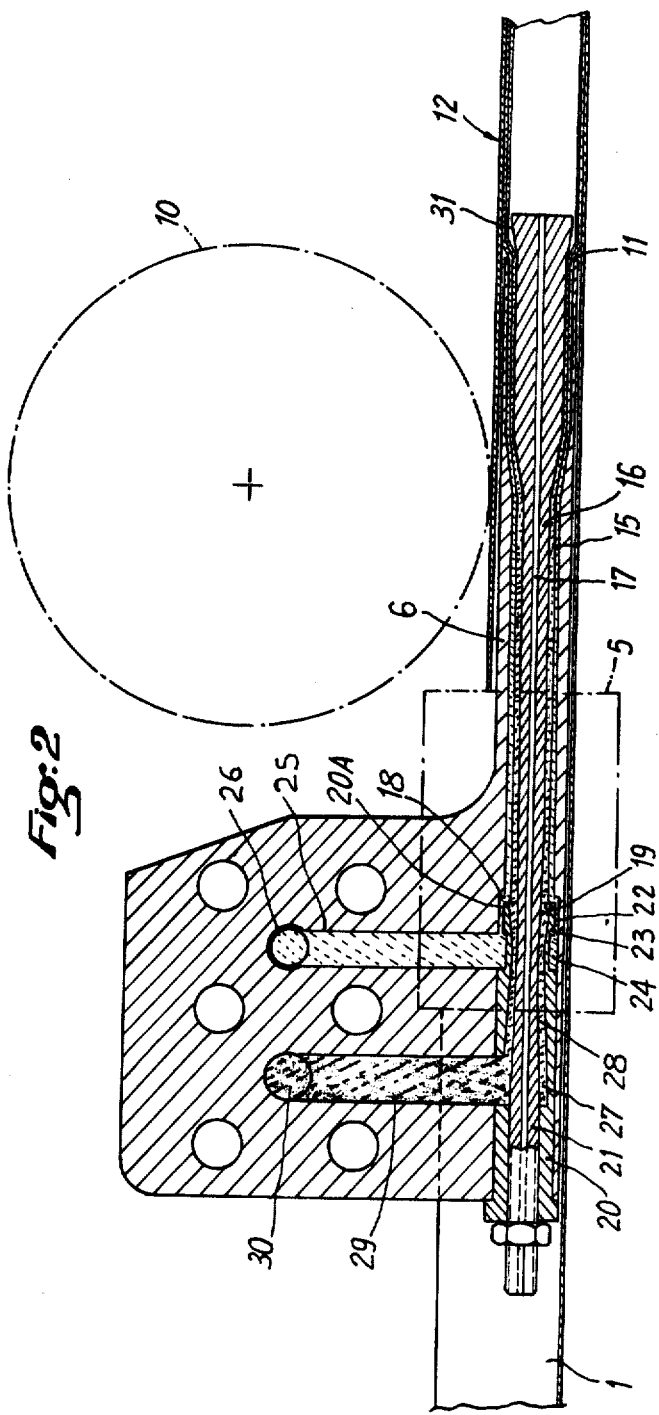

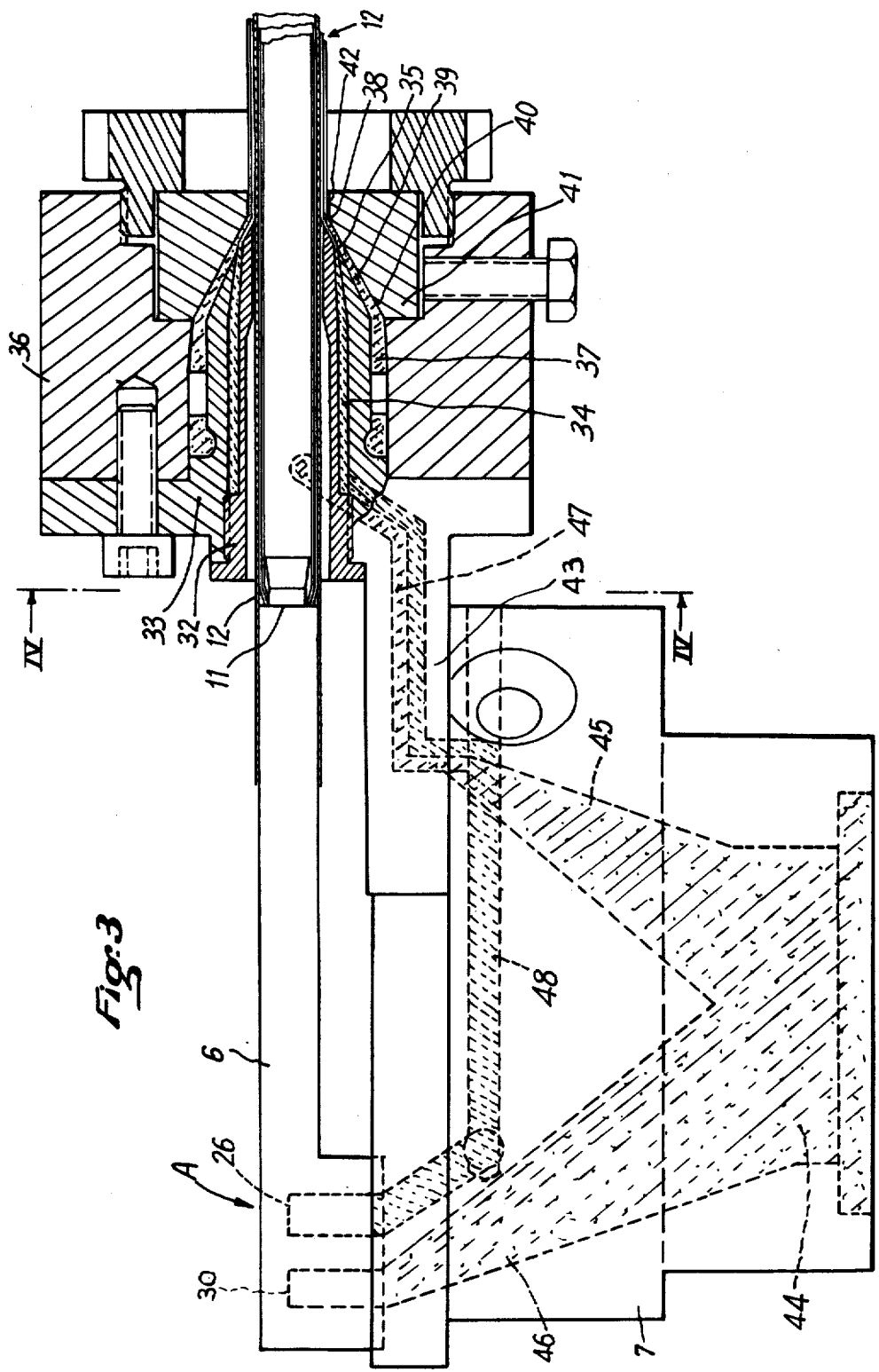

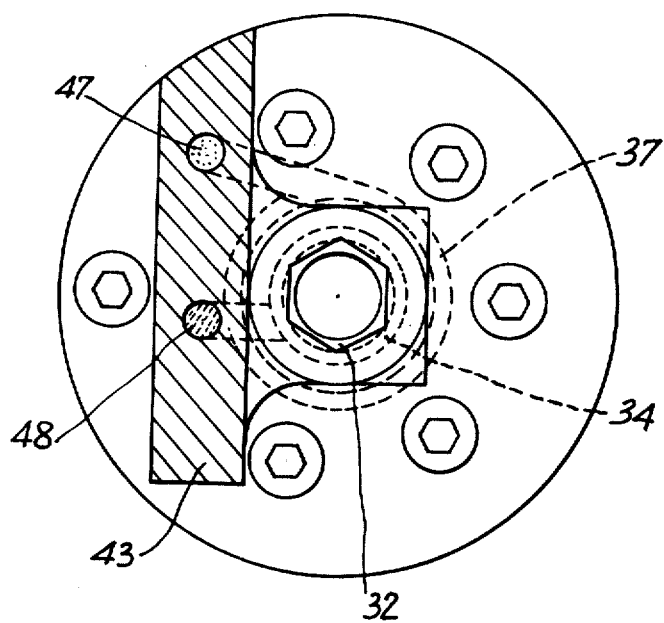

METHOD FOR MANUFACTURING A METAL-PLASTICS COMPOSITE TUBE AND APPARATUS FOR CARRYING OUT SAID METHOD

BACKGROUND OF THE INVENTION

The invention relates to a method for continuously manufacturing a composite tube comprising a metal part and at least an inner part made of plastics material.

Methods of this type are already known, for example by U.S. Pat. No. 3,376,181 to the Continental Can Company (U.S. Ser. No. 298,854), in which a metal tube is made from a strip material closed on itself and longitudinally seamed; directly after seaming, a layer of plastics material is injected into the tube obtained, which constitutes an inner layer lining the metal surface. According to this same patent, to facilitate adherence of the plastics material to the metal, a vacuum is created between the metal tube and the plastics material downstream of a nozzle which furnishes this material in the form of a cone which widens and finishes by being applied on the inner surface of the metal. As a variant, it is also possible to exert, instead of the vacuum, an excess pressure in the part of the composite tube located downstream of the nozzle.

The metal tube lined with plastics material as described in the above-mentioned patent is intended to be cut into discrete lengths to constitute the body of cans which are thereafter closed by a bottom and a lid. It is important that the plastics material adheres well to the metal, but it must be admitted that the cans thus manufactured are not subjected, during use, to stresses putting this adherence to the test.

It is a principal object of the invention to provide a composite tube comprising a metal part and at least an inner part of plastics material, preferably with an outer part likewise of plastics material, which may be used in plumbing for the supply and/or evacuation of various domestic appliances such as wash-basins, bath-tubs, showers, sinks, etc. A tube of this type must withstand treatments which impose severe stresses on the adherence between the metal and the plastics material. For example, on hot water circuits, the composite tube must withstand numerous successive cycles of heating and cooling between ambient temperature and 100° C., without any risk of separation of the metal and the plastics material.

Copper or lead tubes have heretofore been currently used. These two metals have their qualities and their shortcomings. Annealed copper bends and curves easily, but it is then difficult to straighten it perfectly. Lead is very malleable; it bends and straightens up fairly easily, but it is not sufficiently rigid compared with copper and, moreover, it is deformed by creeping even at ambient temperature.

It is an object of the invention to provide a composite tube which is completely inert with respect to water, due to an inner layer of plastics material, and which combines the advantages of copper and lead without having the drawbacks thereof. In brief, the invention aims at obtaining a composite tube which is as malleable as lead and as rigid as copper, so that it may easily be bent and straightened up and so that it keeps its shape even at a continuous temperature of 80° C.

It is certain that this involves excellent adherence between the metal and the plastics material, to a degree which is not necessary with the composite tube of the above-mentioned patent and which this composite tube does not present.

SUMMARY

To attain this result, a tube is made from a strip material which is seamed longitudinally and, according to the process of the invention, a first layer of grafted polyethylene, then a second layer of plastics material which covers the first layer, are extruded inside the tube obtained.

According to another feature of the invention, the metal strip material is closed and seamed around a single extrusion nozzle which presents an annular inner conduit having at its upstream end two concentric inlets, the outer one for the grafted polyethylene and the inner one for the other plastics material, and at its downstream end a single annular outlet.

A polyethylene of cross-linkable type is preferably adopted as polyethylene constituting the second layer.

In numerous circumstances, it is desirable also to deposit a coating on the outer surface of the metal tube to protect it. In this case, according to the invention, a first layer of grafted polyethylene is firstly deposited on the surface of the tube, then a second layer of polyethylene, which is preferably cross-linkable.

The method of the invention enables any metal to be used for making the tube, but it is particularly suitable for aluminium which, in turn, by its combination with the layers of grafted polyethylene and cross-linkable polyethylene, leads to a composite tube being totally inert with respect to the liquids conveyed therein up to 100° C. and combining the qualities of malleability and rigidity of lead and copper in particularly satisfactory manner.

To this end, according to the invention, for a composite tube having dimensions ranging currently from 8 to 14 mm for this type of tube, it is advantageous to use a strip of aluminum which is about 0.2 mm thick and to deposit, inside and outside, a coating comprising a layer of grafted polyethylene with a thickness of the order of 0.1 mm and a layer of cross-linkable polyethylene with a thickness of the order of 0.7 mm.

The invention also relates to an extrusion nozzle comprising an elongated part of which the outer face may be used as means for seaming the metal tube and of which the interior presents an annular conduit having an upstream end with two coaxial inlets and a downstream end, with a single annular outlet.

BRIEF DESCRIPTION OF THE DRAWINGS

In order to show the advantages of the invention more clearly, an embodiment by way of example will now be described with reference to the accompanying drawings, in which:

FIG. 1 is a schematic view in elevation showing a machine for manufacturing a composite tube.

FIG. 2 is an enlarged side view in section through a vertical plane of an inner extrusion nozzle according to the invention, forming part of the machine of FIG. 1.

FIG. 3 is a plan view in section through a horizontal plane of a combined extrusion nozzle for the coextrusion of a grafted polyethylene inside and outside, and of a cross-linkable polyethylene inside and outside the tube, from two extruders, for the machine of FIG. 1.

FIG. 4 is a detailed view in section along IV—IV of FIG. 3.

DESCRIPTION OF THE PREFERRED EMBODIMENTS

The successive members of a machine such as the one of FIG. 1, which is already known as a whole, will firstly be mentioned rapidly, and the new members according to the invention will then be described in detail.

A strip material 1, wound flat in a roll 2 is unwound to pass through a first forming member 3 followed by a heating means 4 which raises the temperature of the U-shaped strip to about 150° C. This strip then arrives at a tube-forming member 5, known per se, which is associated with an extrusion nozzle 6. The latter is combined with a member 7 for supplying plastics material in the nozzle 6. This member 7 is itself connected to the respective outlets of two extruders 8 and 9. The nozzle 6 is sufficiently extended to cooperate with a seaming means which makes the metal tube by closing it by a longitudinal seam.

The seaming means is of any suitable type. In the present example, it is constituted by an ultrasonic generator having a sealing roll 10 which effects seaming when the closed strip is internally supported by the outer surface of the nozzle 6. The latter terminates in a downstream end 11 through which the seamed tube, internally lined with plastics material, emerges.

In the present embodiment of the method of the invention, given by way of example, the strip material 1 is made of aluminum of quality H 24 having a thickness of 0.2 mm. Immediately after the roll 10 has effected seaming, a coating is deposited on the inner face and on the outer face of the tube obtained, said coating being composed of a first layer of grafted polyethylene having a thickness of 0.1 mm, placed directly in contact with the metal, and of a second layer of cross-linkable polyethylene having a thickness of 0.7 mm, deposited directly on the first layer.

The tube 12 obtained after the outlet 11 passes into a tank 13 of cooling water. It is moved by endless tracks 14 installed after the tank 13.

As has already been stated, the outer coating is desirable but not compulsory. Similarly, the outer coating may be deposited by an operation distinct from the deposit of the inner coating, carried out subsequently on a tube which has already been internally lined.

FIG. 2 shows in section the structure of the nozzle 6, according to the invention, enabling two different, superposed layers to be deposited inside the tube in one operation. To facilitate understanding, FIG. 2 shows in dashed and dotted lines the forming member 5 which converts the strip 1 into a closed tube and the roll 10 which seams this tube.

The nozzle 6 has an inner annular conduit 15 which is defined by a die 16 mounted and supported by its end part opposite the outlet 11. This die 16 is pierced at its centre by a passage 17 serving for insufflation of air in the composite tube.

The annular conduit 15 terminates downstream in the outlet 11 and, upstream, it has two concentric inlets, the outer one 18 and the inner one 19. These inlets are materially defined due to a sleeve 20 which contains the end part 21 by which the die 16 is supported. The sleeve 20 terminates in an end face 20A in a chamber 22 which is located just at the beginning of the annular conduit 15. The end part 23 of the sleeve 20 has a diameter smaller than that of the chamber 22 and presents a circular groove 24 opposite which a hole 25 opens into the chamber 22. The hole 25 communicates with a conduit 26 for the inlet of the grafted polyethylene coming from the extruder 9.

Upstream of the chamber 22, the sleeve 20 is fitted in the body of the nozzle and it is internally hollowed, around the die 16, by a chamber 27. The latter is extended by an annular channel 28 limited internally by the die 16. This channel 28 opens in the end face 20A. This face is disposed at a short distance from the beginning of the conduit 15. Due to this arrangement, the latter has two inlets, one, 18, which is constituted by the annular part of the chamber 22 which surrounds the sleeve 20, the other, 19, by the annular channel 28 which opens in the end face 20A. At its opposite end, the chamber 27 is in communication with a hole 29 which itself communicates with a conduit 30 for the inlet of the cross-linkable polyethylene coming from the extruder 8.

During functioning, the two different plastics materials enter simultaneously in the conduit 15, as has been shown with hatchings slanting in opposite directions. The two concentric, annular currents remain in contact without mixing and are pushed after the common outlet 11 against the inner metal face of the seamed strip. This effect is promoted by a widening 31 of the end of the die 16 which extends out of the outlet 11 of the nozzle and by the pressure of the air insufflated in the tube 12 through the passage 17 in the die 16.

In this example, the layer coming into contact with the aluminium is grafted polyethylene from acrylic acid which is found on the market under the trademark PEG of the Compagnie Française de Raffinage. It adheres firmly to the aluminium and is coated with the layer of cross-linkable polyethylene which, here, is of the ethylene silyl copolymer type sold on the market under the trademark Sioplas E of the American firm Dow Corning.

As has already been stated, the aluminum tube may subsequently be coated with two outer layers of polyethylene.

It is advantageous to carry out this operation simultaneously to the inner lining operation which has just been described. The apparatus illustrated in FIG. 3 may then be used.

This apparatus comprises the nozzle 6 of FIG. 2, from which the internally lined tube 12 emerges. Soon after its passage through the outlet 11 of the nozzle, the tube 12 enters in a bushing 32 which is concentric with respect thereto and in which it is guided during its movement. The bushing 32 is itself screwed in a sleeve 33 which is concentric with respect thereto and with which it limits an annular chamber 34 which terminates downstream in an annular outlet 35. In fact, this outlet 35 opens into a truncated end face constituted by the truncated end faces which are completed by the sleeve 33 and the bushing 32. The sleeve 33 is itself mounted in a carrier piece 36 with which it limits an outer annular chamber 37 concentric to the chamber 34. This chamber 37 terminates downstream in an annular outlet 38 at which it ends after a truncated annular portion 39 with progressively decreasing section. This portion 39 is limited by the truncated end faces of the sleeve 33 and the bushing 32 on the one hand and by a truncated inner face 40 of a piece 41 housed in a recess in the piece 36. In the piece 41, the truncated inner face 40 terminates in an outlet 42 which surrounds and which guides the finished, internally and externally coated tube 12.

The assembly which has just been described is held in the axis of advance of the strip 1 seamed around the nozzle 6 due to its fixation to the supply member 7 via a support 43. The nozzle 6 is connected to the supply member 7 by means of screws by one of its lateral faces where the conduits 30 and 26 open out. With the support 43 is coupled the supply member 7 in which an inlet 44 of cross-linkable polyethylene is divided into two branches 45 and 46 which arrive respectively on the one hand at conduit 30, and on the other hand at chamber 37 due to a channel 47. The latter extends through the support 43 and the sleeve 33 from the arm 45 up to the chamber 37. Another channel 48 is drilled in the member 7 and the sleeve 33 to connect the conduit 26 of the nozzle 6 to the chamber 34. In FIG. 3, the channel 48 is located beneath the channel 47 over a part of its length, as FIG. 4 will show.

The conduit 26 is supplied by the extruder 9. In FIG. 1, the extruders 8 and 9 are shown side by side on the same side of the nozzle 6. This arrangement is only schematic. When the extruder 8 is on one side of the nozzle 6, as in FIG. 3, the extruder 9 may be placed on the opposite side, to inject the grafted polyethylene at A in conduit 26; it suffices to arrange the space necessary for the roll 10 (not shown in FIG. 3) between this extruder 9 and the outlet 11 of the nozzle 6.

The apparatus thus comprises a first nozzle, described with reference to FIG. 2, and a second nozzle which is mounted downstream of the first, coaxially thereto; this second nozzle also has two distinct, coaxial inlets 34 and 37 and a single common outlet 38.

With the aid of this apparatus, the seamed tube is lined internally after the outlet 11 of the nozzle 6, as has been explained hereinabove, and it is coated externally very shortly afterwards, on leaving the bushing 32 and the sleeve 33.

The grafted polyethylene meets the cross-linkable polyethylene at the outlet 35 and it accompanies it up to the common outlet 38. Here too, the grafted polyethylene comes into contact with the aluminum tube and ensures good adherence therewith.

Subsequently, the finished tube 12 is subjected to an operation, known per se, in a water bath at 90° C. which causes cross-linking of the layer of cross-linkable polyethylene.

It will be noted that the simultaneous extrusion of the two inner layers through one outlet is advantageous, according to a feature of the method of the invention, when the tube is of relatively small diameter. A tube with a very large diameter would allow two nozzles or one nozzle with two distinct outlets to be more readily positioned. According to another variant of the invention, the second layer of plastics material may be chosen as a function of the use envisaged for the composite tube and is not necessarily cross-linkable polyethylene.

In any case, whatever the final destination of the composite tube, it is advantageous to use the combined nozzle described hereinabove due to which a first extruder supplies the grafted polyethylene both for inside and outside, whilst a second extruder supplies the second layer of plastics material both for inside and for outside, the layer of grafted polyethylene coming from the first extruder ensuring adherence to the aluminum of the material leaving the second extruder.

We claim:

1. A method for the manufacture of a metal tube having two layers of plastics materials coated on the internal surface thereof, comprising:
   (a) moving a strip of metal into a forming means;
   (b) forming the strip into a tube with the longitudinal edges of the strip being in edge contact;
   (c) disposing an extrusion nozzle, having an elongated projecting portion, into the formed tube;
   (d) seaming the formed tube at the said edge contact;
   (e) providing a first and second source of flowable plastic material, each source having communication with the said nozzle, and the first source of plastic material being grafted polyethylene polymer and the second source of plastic material being another polymer;
   (f) extruding the first and second plastic materials through respective orifices in the said nozzle such that concentric tubular forms thereof are produced, and wherein the first plastic material surrounds the second plastic material and forms an outer concentric tube; and
   (g) urging the first and second plastic materials radically outward whereby the first plastic material contacts the inner surface of the seamed tube and bonds thereto and the second plastic material contacts the first plastic material and bonds thereto.

2. The method of claim 1, wherein the two layers are extruded simultaneously inside the tube with the aid of a nozzle having an annular inner conduit with two coaxial inlets at its upstream end and a single annular outlet at its downstream end.

3. The method of claim 1, wherein a first layer of grafted polyethylene polymer and a second layer of another plastics material polymer are also deposited on the outer face of the seamed metal tube.

4. The method of claim 1, wherein a strip of aluminum is used.

5. The method of claim 1, wherein the second plastic material is a cross-linkable polyethylene.

6. An apparatus for manufacturing a metal tube having two layers of plastics materials coated on the internal surface thereof, comprising:
   (a) forming means adjacent to the longitudinal path of movement of a strip of metal used for forming the metal tube, said forming means being adapted for directing the longitudinal edges of the strip into edge contact;
   (b) seaming means for securing the longitudinal edges to form a longitudinally seamed tube;
   (c) extrusion nozzle disposed coaxially in the seamed tube, said extrusion nozzle having an elongated projecting portion projecting into the seamed tube;
   (d) communication means for placing the extrusion nozzle in communication with first and second sources of flowable plastic material, said first source of flowable plastic material being a grafted polyethylene polymer and said second source of plastics material being another polymer;
   (e) extrusion orifices disposed in said nozzle and adapted to form concentric tubular forms from the first and second plastic materials, the first plastic material surrounding the second plastic material; and
   (f) means for urging the two concentric tubular forms of plastic materials radially outwardly whereby the first plastic material contacts the inner surface of the seamed tube and bonds thereto and the second plastic material contacts the first plastic material and bonds thereto.

7. The apparatus of claim 6, in which means support, downstream of the extrusion nozzle a second extrusion nozzle supported coaxially of the internally lined, seamed tube, to cover the outer surface of this tube with plastics material, this second nozzle comprising means placing it in communication with a first and second source of flowable material, the first source being of grafted polyethylene polymer and a second source being of another plastics material polymer, this second extrusion nozzle having an extrusion orifice disposed coaxially with respect to the outside of the internally lined, seamed tube and adapted to form a tubular coating of extruded material, this second extrusion nozzle containing a guide means mounted coaxially inside to guide the flowable material up to the extrusion orifice, the material coming from the first source and the material coming from the second source being guided concentrically and annularly with respect to each other, the material coming from the second source surrounding the material coming first source to form a coating adhering to the outer surface of the internally lined, seamed tube.

8. The apparatus of claim 7, in which a common member supports the first extrusion nozzle and the second extrusion nozzle coaxially with respect to the path of movement of the metal strip material, the second extrusion nozzle being supported downstream of the first extrusion nozzle, this common support comprising means for communication with the two sources of material, this common support further comprising inner conduits for supplying flowable material, which each extend to the first extrusion nozzle and to the second extrusion nozzle, respectively, in order simultaneously to supply these two nozzle from a single first source and a single second source of flowable material.

* * * * *